Oct. 4, 1949.     H. E. BUTLER     2,483,724
SPOON HOLDER
Filed July 1, 1946
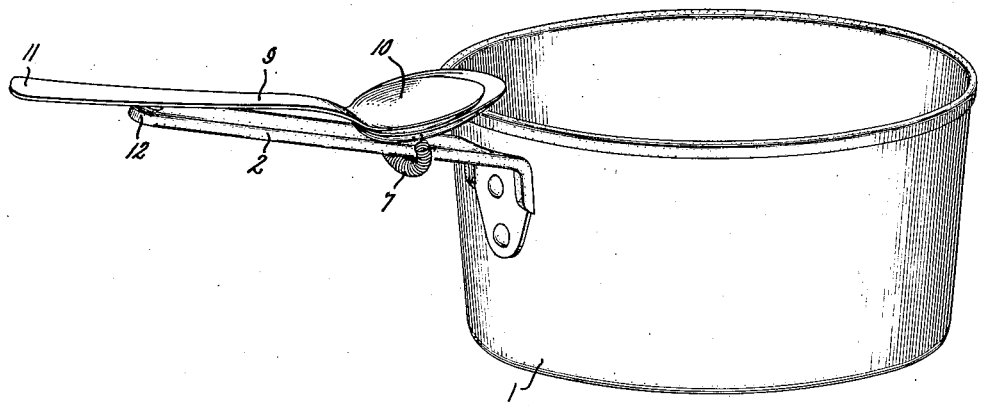
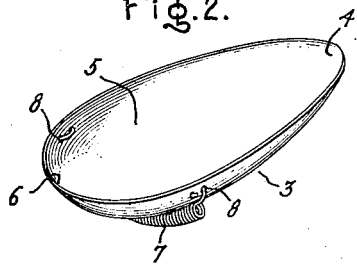
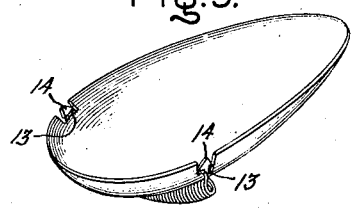
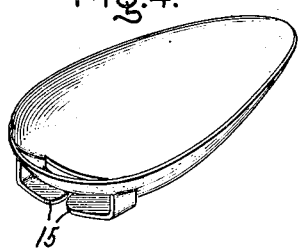
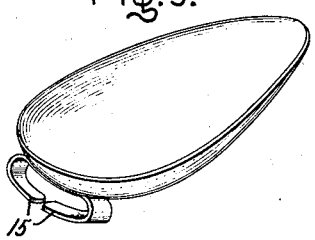
Inventor:
Henry E. Butler Patented Oct. 4, 1949

2,483,724

UNITED STATES PATENT OFFICE 2,483,724

SPOON HOLDER

Henry E. Butler, Scotia, N. Y.

Application July 1, 1946, Serial No. 680,715

1 Claim. (Cl. 65—65)

The present invention relates to spoon holders and is in the nature of a modification of the invention disclosed and claimed in my Patent Number 2,034,940, patented March 24, 1936.

The object of my invention is to provide an improved spoon holder for attachment to the handle of a saucepan which is simple in structure, easily attached to and removed from the handle of a saucepan and capable of being manufactured at low cost.

For a consideration of what I believe to be novel and my invention, attention is directed to the following specification and to the claim appended thereto.

In the drawing, Fig. 1 is a perspective view of a saucepan with my improved spoon holder attached to the handle of the pan and showing a spoon resting in the spoon holder; Fig. 2 is a perspective view of the spoon holder shown in Fig. 1, and Figs. 3, 4 and 5 are perspective views of modifications.

Referring to the drawing, 1 indicates a saucepan having a handle 2. It may be of any suitable material and size and is to be taken as typical of saucepans generally.

My improved spoon holder comprises a shallow bowl 3 of the general contour of the bowl of a spoon and preferably somewhat larger than the bowl of the largest spoon with which it is intended to be used. It is elongated in shape. Its forward end or tip 4 is preferably tapered toward a point and its rear end 5 is blunt and has a curvature of large diameter compared to the tip to provide a curved rear wall 6 adapted to extend transversely of the handle of a saucepan. Associated with the rear end of the bowl 3 is a holding means for attaching the spoon holder to a saucepan handle. In Fig. 2, the holding means is in the form of a coiled spring 7 which extends beneath the bowl 3 at a point near to but spaced from its rear end and has its ends fastened in openings 8 at opposite sides of the bowl.

The holder is attached to a handle by sliding it down over the handle with the bowl of the holder above the handle and the spring beneath the handle. The spring is short enough so that it clamps the bowl firmly to the handle with the rear portion of the bowl in contact with the handle and the tip of the bowl above the handle so that the bowl slopes downward from its tip to its rear end as shown clearly in Fig. 1. By reason of this arrangement, a spoon as indicated at 9 may be positioned with its bowl 10 in the bowl of the holder and its handle 11 resting on the saucepan handle at a point 12 spaced from the bowl of the holder. Thus the spoon is supported at two spaced points on the handle 2.

Fig. 3 shows another way for fastening the ends of the holding spring to the bowl, the ends 13 of the spring being hooked over heads 14 formed by notches in the edges of the spoon.

In Figs. 4 and 5, instead of using a spring for fastening the bowl to a handle, I utilize arms 15, the arms being formed from the material of the bowl in Fig. 4 and being separately formed and attached to the bowl by soldering, welding or the like in Fig. 5. In each case, it will be noted that the arms 15 are at the rear or base end of the bowl so that when attached to a saucepan handle the tip of the bowl will be tilted upward.

In any of the modifications, the holder may be pushed down on the handle until its tip 4 rests on the edge of the pan as shown in Fig. 1 thus providing a two point support for the bowl of the holder and at the same time giving a desired tilt to the bowl. The spring 7 will yield readily to permit of this and the arms 15 may have sufficient flexibility to yield somewhat. However, this is not required necessarily since the arms 15, being at the rear of the bowl, tilt its forward end upward and since the bottom of the forward end thus slopes downwardly, the holder may be pushed along the handle until the bottom of the bowl strikes the rim of the pan. In any case, the arms 15 will hold the bowl firmly without the bottom of the bowl contacting the pan rim.

My improved spoon holder has, among others, the advantages that it is simple in structure and capable of being quickly and easily attached to and removed from saucepan handles of various sizes and cross sectional contours so that it may be used with the different kinds of saucepans found on the market.

What I claim as new and desire to secure by Letters Patent of the United States, is:

A spoon holder to be attached to the handle of a saucepan comprising an elongated bowl of a size to support the bowl of a spoon, the forward end of said elongated bowl being tapered toward a point and its rear end being blunt and having a curvature of large diameter compared to the tip, and holding means carried by the bowl at said rear end and positioned under said rear end for clamping the bowl to a saucepan handle whereby when the spoon holder is positioned on a saucepan handle its rear end will be in engagement with the top surface of the handle and its forward end will be spaced angularly upward away from such top surface.

HENRY E. BUTLER.

REFERENCES CITED

The following references are of record in the file of this patent:

UNITED STATES PATENTS

| Number | Name | Date |
|---|---|---|
| D. 21,539 | Griffith | May 17, 1892 |
| 111,281 | Walker | Jan. 24, 1871 |
| 148,355 | Dennett | Mar. 10, 1874 |
| 277,304 | Maeder | May 8, 1883 |
| 1,182,732 | Avery | May 9, 1916 |
| 1,196,543 | Hauf | Aug. 29, 1916 |
| 1,212,185 | Cobb | Jan. 17, 1917 |
| 1,220,531 | Nehr | Mar. 27, 1917 |
| 1,472,995 | Simone | Nov. 6, 1923 |
| 1,735,144 | Tanner | Nov. 12, 1929 |

FOREIGN PATENTS

| Number | Country | Date |
|---|---|---|
| 946 | Great Britain | Jan. 18, 1892 |
| 202,096 | Great Britain | Aug. 16, 1923 |